(12) United States Patent
Raif et al.

(10) Patent No.: US 11,682,142 B2
(45) Date of Patent: Jun. 20, 2023

(54) INFORMATION WEIGHTED RENDERING OF 3D POINT SET

(71) Applicant: Raytheon Company, Waltham, MA (US)

(72) Inventors: Stephen J. Raif, Sachse, TX (US); Allen Hainline, Rowlett, TX (US)

(73) Assignee: Raytheon Company, Waltham, MA (US)

( * ) Notice: Subject to any disclaimer, the term of this patent is extended or adjusted under 35 U.S.C. 154(b) by 199 days.

(21) Appl. No.: 17/020,195

(22) Filed: Sep. 14, 2020

(65) Prior Publication Data

US 2021/0192789 A1 Jun. 24, 2021

Related U.S. Application Data

(60) Provisional application No. 62/951,989, filed on Dec. 20, 2019.

(51) Int. Cl.
*G06T 7/90* (2017.01)
*G06T 15/08* (2011.01)
*G06T 17/10* (2006.01)

(52) U.S. Cl.
CPC ............... *G06T 7/90* (2017.01); *G06T 15/08* (2013.01); *G06T 17/10* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 6,373,977 B1* | 4/2002 | Culbertson | G06T 17/00 382/285 |
| 6,990,228 B1* | 1/2006 | Wiles | G06T 7/55 348/42 |
| 9,547,936 B2 | 1/2017 | Patel et al. | |
| 9,704,041 B2 | 7/2017 | Haglund et al. | |
| 9,984,498 B2* | 5/2018 | Loop | G06T 17/00 |

(Continued)

FOREIGN PATENT DOCUMENTS

| | | |
|---|---|---|
| EP | 3467785 A1 | 4/2019 |
| JP | 2019053738 A | 4/2019 |
| WO | WO-2021126339 A1 | 6/2021 |

OTHER PUBLICATIONS

Ivan Dryanovski et al., "Large-scale, real-time 3D scene reconstruction on a mobile device", Auton Robot (2017) 41:1423-1445 (Year: 2017).*

(Continued)

*Primary Examiner* — Tize Ma
(74) *Attorney, Agent, or Firm* — Schwegman Lundberg & Woessner, P.A.

(57) ABSTRACT

Subject matter regards colorizing a three-dimensional (3D) point set. A method of colorizing a 3D point can include voxelizing 3D points including the 3D point into voxels such that a voxel of the voxels including the 3D point includes a voxel subset of the 3D points, projecting the voxel subset to respective image spaces of first and second images used to generate the 3D points, and associating a color value, determined based on a respective number of pixels of the first and second images to which the voxel subset projects, with the 3D point.

11 Claims, 6 Drawing Sheets

(56) References Cited

U.S. PATENT DOCUMENTS

2005/0013491 A1* 1/2005 Cieplinski .......... G06F 16/5838
382/226
2011/0115812 A1 5/2011 Minear et al.

OTHER PUBLICATIONS

"International Application Serial No. PCT/US2020/053273, International Search Report dated Dec. 17, 20", 6 pgs.
"International Application Serial No. PCT/US2020/053273, Written Opinion dated Dec. 17, 2020", 7 pgs.
Cho, Sunyoung, et al., "Efficient Colonization of Large-Scale Point Cloud Using Multipass Z-Ordering", 2nd International Conference On 3d Vision, IEEE, vol. 1, (Dec. 8, 2014), 689-696.
"International Application Serial No. PCT/US2020/0532/3, International Preliminary Report on Patentability dated Jun. 30, 2022", 9 pgs.

* cited by examiner

INFORMATION WEIGHTED RENDERING OF 3D POINT SET

RELATED APPLICATION

This application claims the benefit of priority to U.S. Provisional Patent Application 62/951,989 filed on Dec. 20, 2019 and titled "Information Weighted Rendering of 3D Point Set", which is incorporated herein by reference in its entirety.

TECHNICAL FIELD

Some embodiments described herein generally relate to rendering a view of a 3D point cloud that better represents reality.

BACKGROUND

Current rendering of three-dimensional (3D) point sets can use a "median filter" to determine an intensity value for a point. For a given 3D point of the 3D point set, the median filter identifies a median value of respective corresponding pixels of all the images used to generate the 3D point set. The median value is then used as the intensity value for the point in the 3D point set. The median value, however, may not provide useful intensity information. For example, a point of the 3D point set can be generated using mostly points that are deep shadow. In such an example, the median value will be deep shadow. However, the deep shadow can obscure the actual structure that may be visible in some of the images used to generate the 3D point set.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
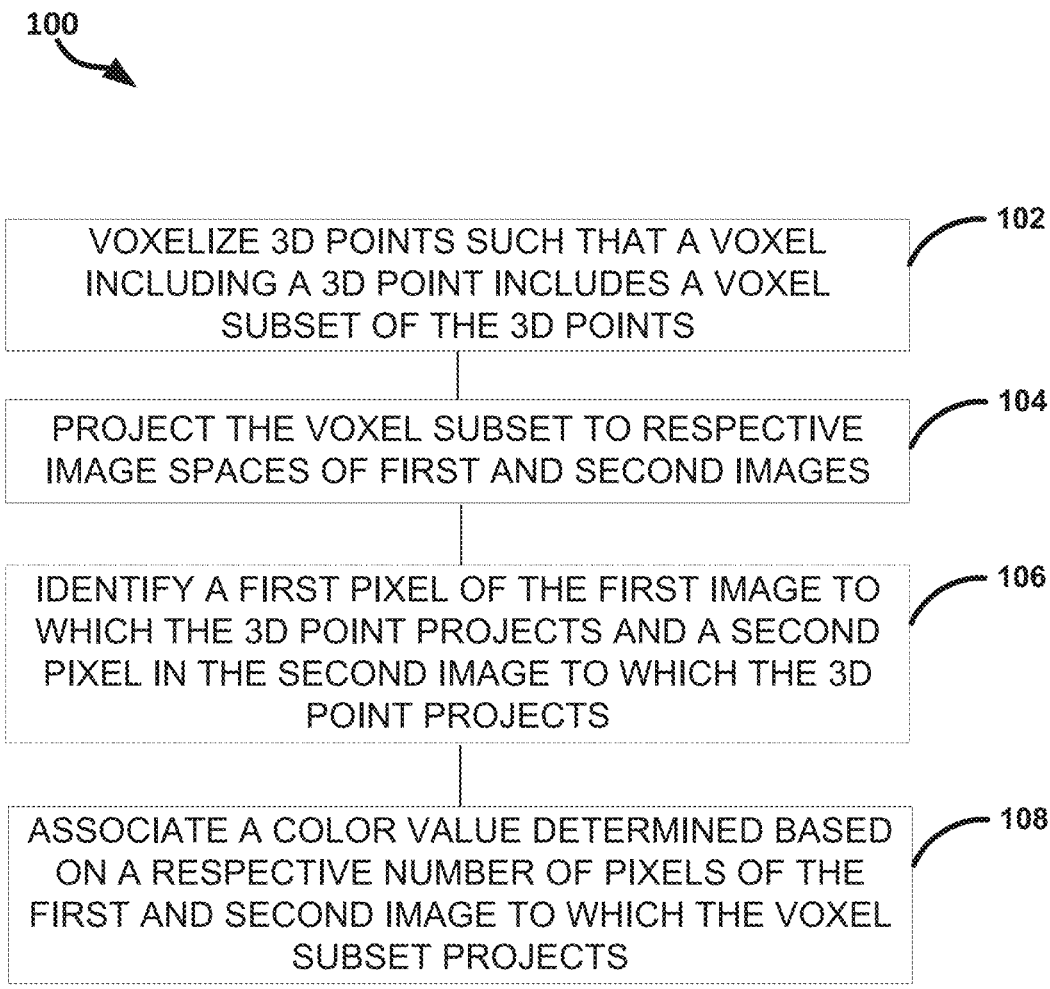
FIG. 1 illustrates, by way of example, a diagram of an embodiment of a method for colorizing a 3D point.

Aspects of embodiments regard improving an intensity (e.g., saturation) or color value of a point provided with a 3D point set. A 3D point set with color information (e.g., intensity value, color value (e.g., red, blue, green, grayscale, etc.), multi-spectral value, hyperspectral value, vegetative index value (e.g., normalized difference vegetation index (NDVI), or the like), the like, or a combination thereof) can be used in more applications than the same 3D point set without the intensity or color information. Consider that an analyst attempting to exploit a 3D point set without color information, would not be able to identify locations of stripes on a runway or windows on a building, whereas this would be possible with the color information.

However, many 3D point clouds do not natively have the color information, or the associated color information is suboptimal. For example, light detection and ranging (LIDAR) point clouds often have no color information. For the LIDAR case, and others, it can be useful to attribute the 3D point cloud with two-dimensional (2D) imagery that covers the same area of interest. However, each 2D image can see only a portion of a 3D scene. Thus it is useful to use multiple 2D images to attribute the entire 3D scene with a "Composite" rendering of these multiple 2D images. The remaining discussion regards color information in the form of color value. It is to be understood that the color value includes an intensity value, vegetation index, or other color information.

A prior technique of colorizing a 3D point set performs composite image rendering by using a simple median filter. In the median filter, all available pixels of 2D images are projected to a 3D point in the 3D space. The median intensity/color value for each 3D point is then applied to that 3D point. This has the advantage of providing an "averaging" effect on the rendered scene, but it also unfortunately causes a blurring and/or darkening effect when the majority of images are at either a poor viewing angle or poor illumination for the 3D point being represented.

A goal of embodiments can be to pick color values for each 3D point of a 3D model that maximizes the useful information for that 3D point. Embodiments provide a simple technique that uses a number of intersecting integral pixel locations that are valid for the given source image or, said another way, a count of unique integral line/sample pairs resulting from projecting non-occluded 3D points of a voxel into the image as a measure of useful information. The technique can include splitting the 3D point cloud into voxels, and projecting the 3D points of each voxel into each image, counting the number of unique pixels (e.g., unique integer line/sample value) to which the points of the voxel project. Colorizing a 3D point set using the images with the most unique pixels for a given voxel can naturally optimize some important considerations (ground sample distance (GSD), obscuration, incidence angle, or the like) into a single value (number of pixels to which that voxel projects). The number of unique pixels can be used to calculate a "visibility weight" for that image for all 3D points in the voxel. Embodiments can include projecting each 3D point to each image to extract a color value. Embodiments can apply an additional "illumination weight" for each image based on that image's brightness at that point. Finally, the intensity value applied to a given 3D point can be the weighted sum of intensity of the images to which the corresponding voxel projects, weighted by one or more of the visibility weight and the illumination weight. The weighted sum can be across all images that "see" that 3D point.

The voxel size can be configured such that each voxel nominally contains a specified number of the 3D points. The voxel size can be a function of the specified number of points and the GSD of the imagery. For example, to get a nominal number of 3D points in the range [20, 100] for imagery of a GSD of 0.4 meters, a 3×3×3 meter voxel size can be chosen. Reference will now be made to the FIGS. to describe further details of embodiments.

In some embodiments, a shadow detection techniques, such as one that uses 3D points plus a-priori solar position information to predict and confirm shadow locations can affect the "illumination weight" for a 3D point. For example, if according to the shadow detection technique, the 3D point is determined to be in shadow, the illumination weight can be set to a low value, for example, "0", while a 3D point that is determined to be in direct sun, can be set to a high value, for example "1".

In some embodiments each input image can be radiometrically mapped to a more consistent reference space. The remapped color information can provide a "smoother" output product as the source intensities are normalized into a common reference intensity range by the remapping.

In some embodiments, outliers can be excluded (e.g., if the color information of one image's inputs differs from those of all other images then it should likely be excluded altogether for a given voxel). Consider an example in which there are a lot of images that were used to generate the 3D point set and the 3D points in a voxel map to large number of unique pixels in the image. Rather than de-weighting (reducing a value of the illumination weight for that pixel) abnormally dark pixels can be discarded. For example, pixels in cloud shadows can be discarded and not just de-weighted via the illumination weighting.

The shadow detection technique can be used on the images. Confident shadow regions can be histogrammed to characterize that most shadows are darker than the 90% percentile (or other threshold) of the histogram. For example, if most images saw a location as 70th-90th percentile but another image measured is at say the 20th percentile and it was below the shadow threshold, then the latter can be considered an outlier and removed.

FIG. 1 illustrates, by way of example, a diagram of an embodiment of a method 100 for colorizing a 3D point. The method 100 as illustrated includes voxelizing 3D points such that a voxel including the 3D point includes a voxel subset of the 3D points, at operation 102; projecting the voxel subset to respective image spaces of first and second images, at operation 104; optionally identifying a first pixel of the first image to which the 3D point projects and a second pixel in the second image to which the 3D point projects, at operation 106; and associating a color value, determined based on a respective number of pixels of the first and second image to which the voxel subset projects, with the 3D point, at operation 108.

Voxelizing, at operation 102, means to group according to location in space. A voxel typically represents a subset of a volume of space. For example, a 99×99×99 meter volume of space can be split into 27 notional voxels that each represent a 33×33×33 meter volume of that space. Each of the voxels can be represented by an index (e.g., an integer value [0, 26] in the example described) that indicates uniquely indicates the voxel. Each 3D point of the 3D point set can be associated with the index of the voxel that includes the 3D point.

The first and second images from operation 104 can be from the images used to generate the 3D point set. Typically a 3D point set is generated based on multiple 2D images of a same geographic region. Photogrammetry is then performed on the data of 2D images to generate the 3D model. Photogrammetry can include performing a geometric bundle adjustment on the 2D images, to register the geometry of the 2D images to each other. The bundle adjustment can adjust geometry of an image of the images defined in metadata to be consistent with geometry of other images of the images. Other image registration techniques are possible. For example, 2D images not previously associated with the 3D point cloud can be registered to the 3D point cloud. Tie-points can be identified between each 2D image and the 3D point cloud, and then the geometry of each 2D image is adjusted to match the 3D point cloud.

The operation 104 can include using a rational function (provided in metadata) to perform the projection. A rational function describes the relationship between image coordinates and ground coordinates. The rational function expresses the mapping of the image space coordinates of rows and columns (r, c) onto the object space reference surface geodetic coordinates (j, l, h). The rational function is an approximation expressing the normalized row and column values, (rn, cn), as a function of normalized geodetic latitude, longitude, and height, (P, L, H), given a set of normalized polynomial coefficients (LINE_NUM_COEF_n, LINE_DEN_COEF_n, SAMP_NUM_COEF_n, SAMP_DEN_COEF_n). Normalized values, rather than actual values are used to help reduce errors during the calculations. The transformation between row and column values (r, c), and normalized row and column values (rn, cn), and between the geodetic latitude, longitude, and height (j, l, h), and normalized geodetic latitude, longitude, and height (P, L, H), is defined by a set of normalizing translations (offsets) and scales that ensure all values are contained in the range −1 to +1.

Ultimately, a rational function provides a way to project a 3D point to image space, convert the 3D point from its native format (normally universal transverse Mercator (UTM)) to geodetic (latitude, longitude, height). The geodetic coordinates are used as inputs for a rational function pair. A pair because there is one rational function for "row", and another rational function for "column". The rational function for the row, Rn, can be evaluated at (latitude, longitude, height) to provide a row (e.g., "line" or "Y-value") location in image space. The rational function for the column, Cn, can be evaluated at (latitude, longitude, height) to provide a column (e.g., "sample" or "X-value") location in image space. A pixel intensity, color, brightness value, corresponding to the (row, column) location can then be extracted from the image data.

The operation 108 can further include determining a first weight for a first color value of the first pixel based on the number of pixels of the first image to which the voxel subset projects. The operation 108 can further include determining a second weight for a second color value of the second pixel based on the number of pixels of the second image to which the voxel subset projects. The first and second weights can be proportional to the number of pixels to which the voxel subset projects in the first and second images, respectively. The operation 108 can further include determining the color value as a weighted combination of the first and second color values based on the first and second weights. More details regarding this operation are provided regarding FIG. 2.

The operation 108 can further include determining a first brightness value for the first pixel. The operation 108 can further include determining a second brightness value for the second pixel. The operation 108 can further include determining a third weight for a first color value of the first pixel based on the first brightness value. The operation 108 can further include determining a fourth weight for a second color value of the second pixel based on the second brightness value. The third and fourth weights can be proportional to the first and second brightness values, respectively. The operation 108 can further include determining the color value as a weighted combination of the first and second color values based on the third and fourth weights.

The operation 108 can include determining the color value based on a combination of the first and second color values and the first, second, third, and fourth weights. For example, the color value of the 3D point can be set to {first weight○third weight■first color}+{second weight○fourth weight■second color}, where ○ and ■ represent mathematical operations or functions, such as addition, subtraction, multiplication, division, log, exponential, power, modulo, a combination thereof, or the like. In some embodiments, the weights, or combinations of weights, can be normalized such that their sum adds to unity, or about unity.

Figure 2:
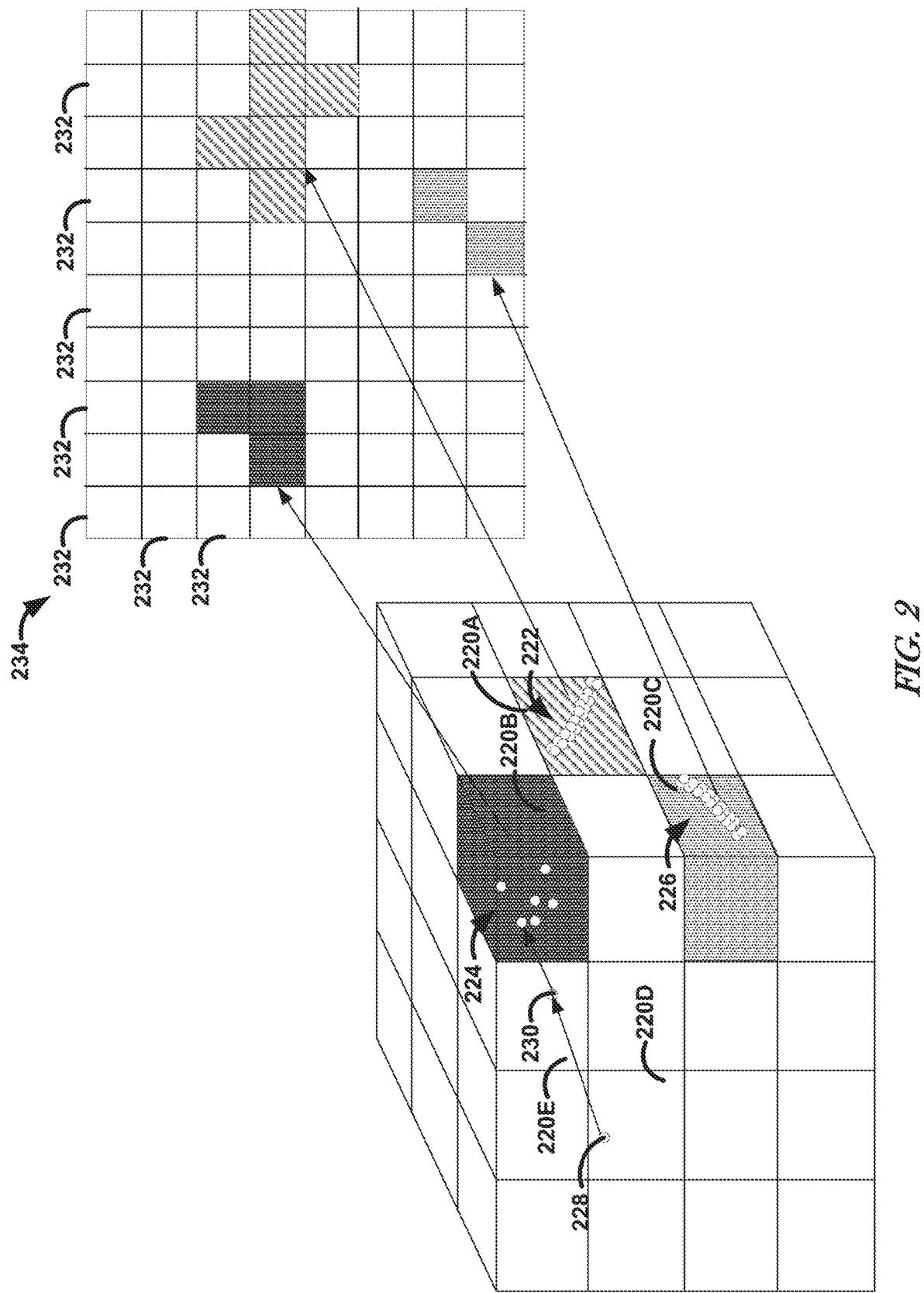
FIG. 2 illustrates, by way of example, a diagram of an embodiment of performing a portion of a projection operation after voxelizing the 3D point set.

FIG. 2 illustrates, by way of example, a diagram of an embodiment of performing a portion of a projection operation (the operation 104) after voxelizing the 3D point set (performing operation 102). In FIG. 2 3D points 222, 224, 226, 228, 230 are determined to be located in voxels 220A, 220B, 220C, 220D, 220E. Not all voxels are labeled in FIG. 2 so as to not obscure the view, only voxels with 3D points therein are labeled in FIG. 2. The 3D points 222, 224, 226, 228, 230 are projected to pixels 232 in an image space 234. The 3D point 228 is obscured from view in the image 234 is occluded from view by the 3D point 230.

The 3D points in a voxel are sometimes called a voxel subset. In the example of FIG. 2, the 3D points 224 in the voxel 220B project to three different pixels 232 in the image 234, the 3D points 222 in the voxel 220A project to six different pixels 232 in the image 234, and the 3D points 226 in the voxel 220C project to two different pixels 232 in the image 234.

The weight can be determined based on the number of pixels to which the voxel subsets project across all images. For example, consider that the 3D points 222 project to the six pixels of the image 234 and further project to four pixels in a second image. The weight for the color in the image 234 can be set to 0.6 (6/(6+4)) and the weight for the color in the second image can be set to 0.4 (4/(6+4)).

Consider the voxel 220C, a surface normal of the points in this voxel 220C is about orthogonal to the image lines of sight. This results in numerous 3D points 224 projecting to a smaller number of pixels 232 in the image 234. Consider the voxel 220B. Multiple of the points 224 can project to a same pixel 232 in the image 234. This is exacerbated if the image 234 has poor GSD or poor incidence angle. Thus, the unique number of pixels of the image 234 to which the 3D points 224 project is a simple, quantifiable representation of the amount of information the image 234 provides for that voxel 220B.

Consider the voxel 220A, a surface normal of the 3D points 222 in the voxel 220A is collinear with the image 234 line of sight. This results in the 3D points 222 projecting to more of the pixels 232. The 3D point 230 occludes the 3D point 228, thus the 3D point 228 is not represented in the image 234. Similarly, the 3D point 230 is not represented in the image 234, because it is occluded by one or more of the 3D points 224.

Figure 3:
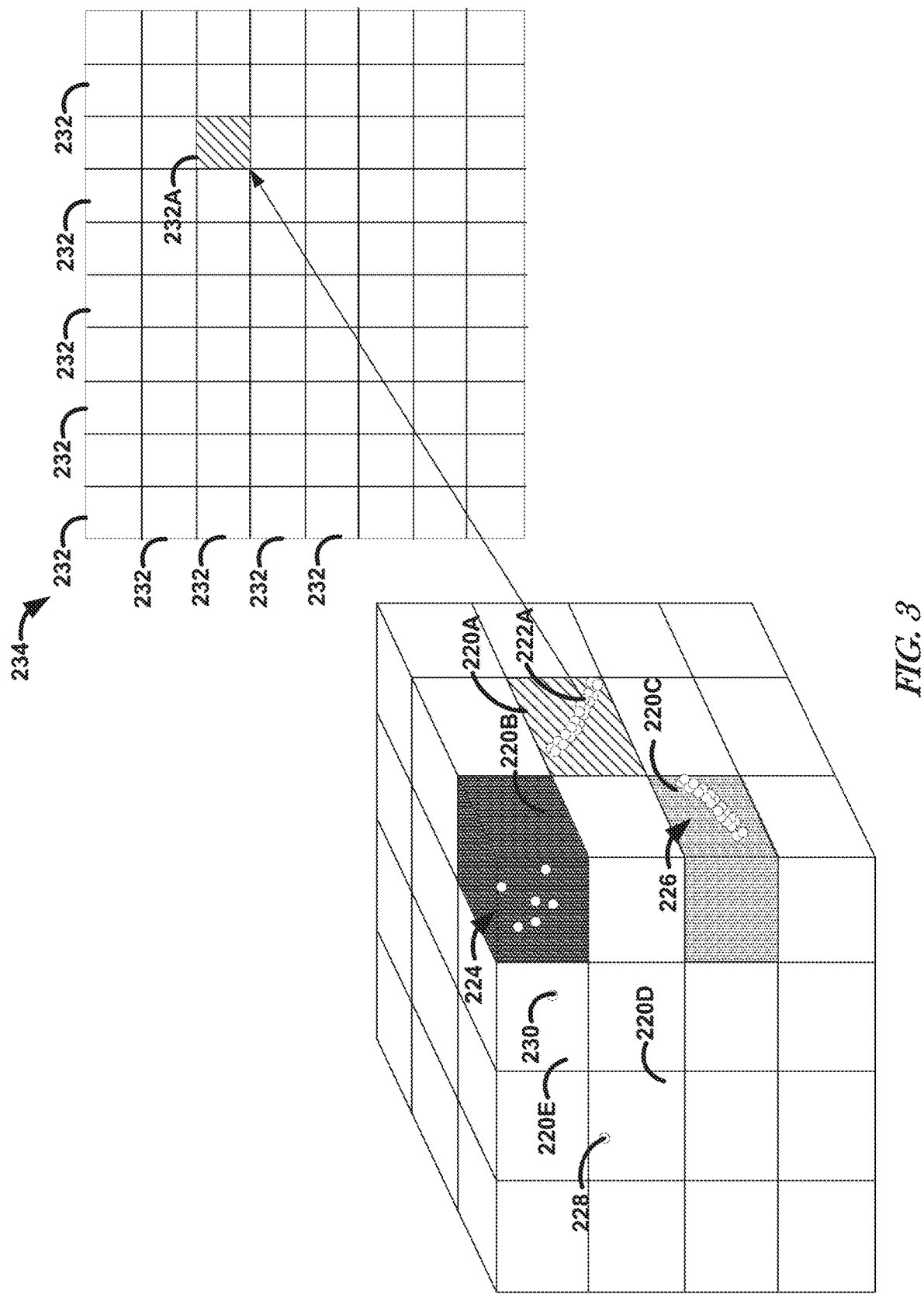
FIG. 3 illustrates, by way of example, a diagram an embodiment of performing a projection operation and identifying a pixel to which a 3D point projects.

FIG. 3 illustrates, by way of example, a diagram an embodiment of performing a projection operation and identifying a pixel to which a 3D point projects (a portion of the operation 106). In FIG. 3, a 3D point 222A is projected to pixel 232A of the image 234. The pixel can have an associated color value. A similar projection and pixel identification process can be performed to identify pixels in other images, at least a second image, to which the 3D point 222A projects. The color value in some embodiments, for each of the 3D points 222 in the voxel 220A can be set to (weight1*color value in the image 234+weight2*color value in the second image).

In some embodiments, a brightness value of a pixel to which the 3D point projects can be used, along with the color value of the pixel to which the 3D point projects, to determine the weight applied to a color value. For example, consider that the 3D point 222A projects to the pixel 232A and the pixel 232A includes a corresponding brightness value, B1. Further consider that the 3D point 222A projects to a pixel in the second image and that pixel includes a corresponding brightness value, B2. The weight of the color value can be altered in accord with the brightness values. That is, weight1 and weight2 can be adjusted based on the brightness value. The weight adjustment can include multiplying the weight by (brightness value of pixel)/(maximum pixel brightness value in image or maximum possible pixel brightness value).

In some embodiments a total weight can be determined based on one or more of the visibility weight, number of unique pixels to which 3D points in a corresponding voxel project, illumination weight, illumination score, or lowest value of a non-shadowed pixel in an image. For example, the total weight can be determined as weight1*weight2 where weight1 is determined based on the number of unique pixels to which 3D points in a corresponding voxel project, a corresponding visibility weight, an illumination score, and the intensity weight. The illumination score can be set to 1 if a pixel color information value is greater than an intensity cutoff value, otherwise can be set to the pixel color information value divided by the intensity cutoff value.

The operations discussed can be performed for each of the points in the 3D point set. The color values can be used to colorize the 3D point set. A view of the colorized 3D point set can be presented to a user on a display (e.g., display device 810 of FIG. 4). The view of the image is more accurate than the prior techniques of colorizing the 3D point set. Comparisons of the results of using the median color value and embodiments herein show much more detail in dark areas or bright areas. The details, for example, between buildings, in window sills, in the shadow of a building, in direct sun, or the like are much improved using embodiments.

Embodiments can use "the number of unique pixels that see a voxel" from a given image as a measure of "information content". Embodiments can provide a fast and accurate alternative to a direct comparison to local surface-normal. Embodiments provide a physically-derived weighting factor that naturally combines at least three separate considerations, GSD, occlusion (visibility), and incidence angle, to determine which image has the most "information" to offer for a given 3D point. For example, a particular image with an exceptional resolution may more-than-compensate for a suboptimal incident angle. By measuring this in a single physically derived "information content" value, embodiments simultaneously consider both factors without having to introduce an arbitrary set of weights. Embodiments provide a fast and safe calculation. It is fast and safe because embodiments do not directly perform a least squares optimization on the local 3D points to determine a local surface normal, an approach that has both performance and numerical risks.

Figures 4, 5:
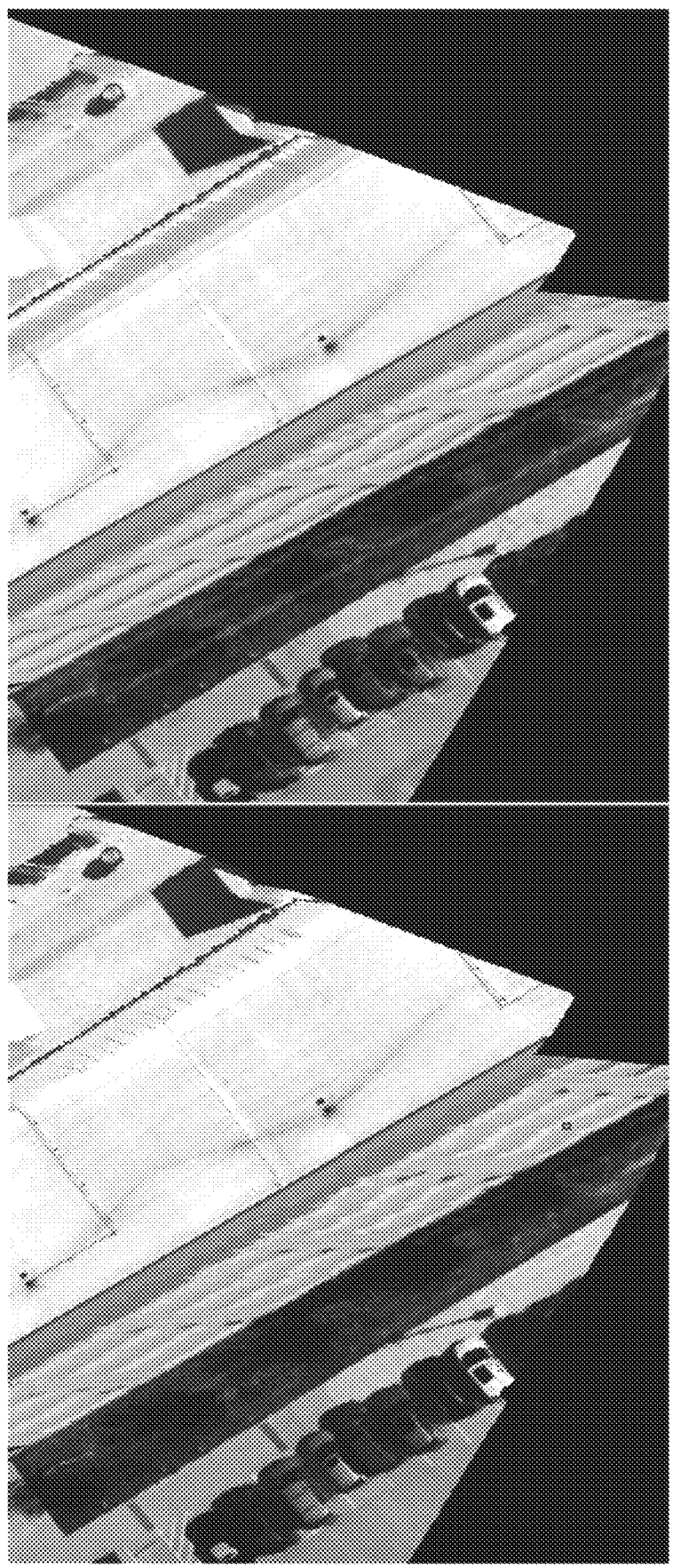
FIGS. 4 and 5 illustrate, by way of example, images of a building with prior rendering and information weighted rendering of embodiments, respectively.

FIGS. 4 and 5 illustrate, by way of example, images 400, 500 of a building with prior rendering and information weighted rendering of embodiments, respectively. A difference between the prior technique and embodiments is in the rendering of vertical surfaces, such as walls and sides of vehicles. FIG. 4 shows an image of a building rendered using a traditional rendering approach, which renders each 3D point with the median of all image projection rays available. FIG. 5 shows an image of the same building and using the same data used to generate the image of FIG. 4, but the image of FIG. 5 is rendered with "information weighted" mean of all image projection rays available. For the example of FIG. 5, images whose line-of-sight is orthogonal to the windows (e.g., images that see the windows "head-on") are weighted more highly than images whose line-of-sight grazes the windows (e.g., images that see the windows from a slanted perspective), thereby making the rendering of the windows more accurate and pronounced.

Figures 6, 7:
FIGS. 6 and 7 illustrate, by way of example, images of a vehicle with prior rendering and information weighted rendering of embodiments, respectively.

FIGS. 6 and 7 illustrate, by way of example, images of a vehicle with prior rendering and information weighted rendering of embodiments, respectively. The images of FIGS. 6 and 7 show a zoomed-in view of a three dimensional (3D) model of a car. The rendering of the passenger side door/window is much better for the "information weighted" rendering of FIG. 7 than it is for the rendering using the traditional approach in FIG. 6.

Figure 8:
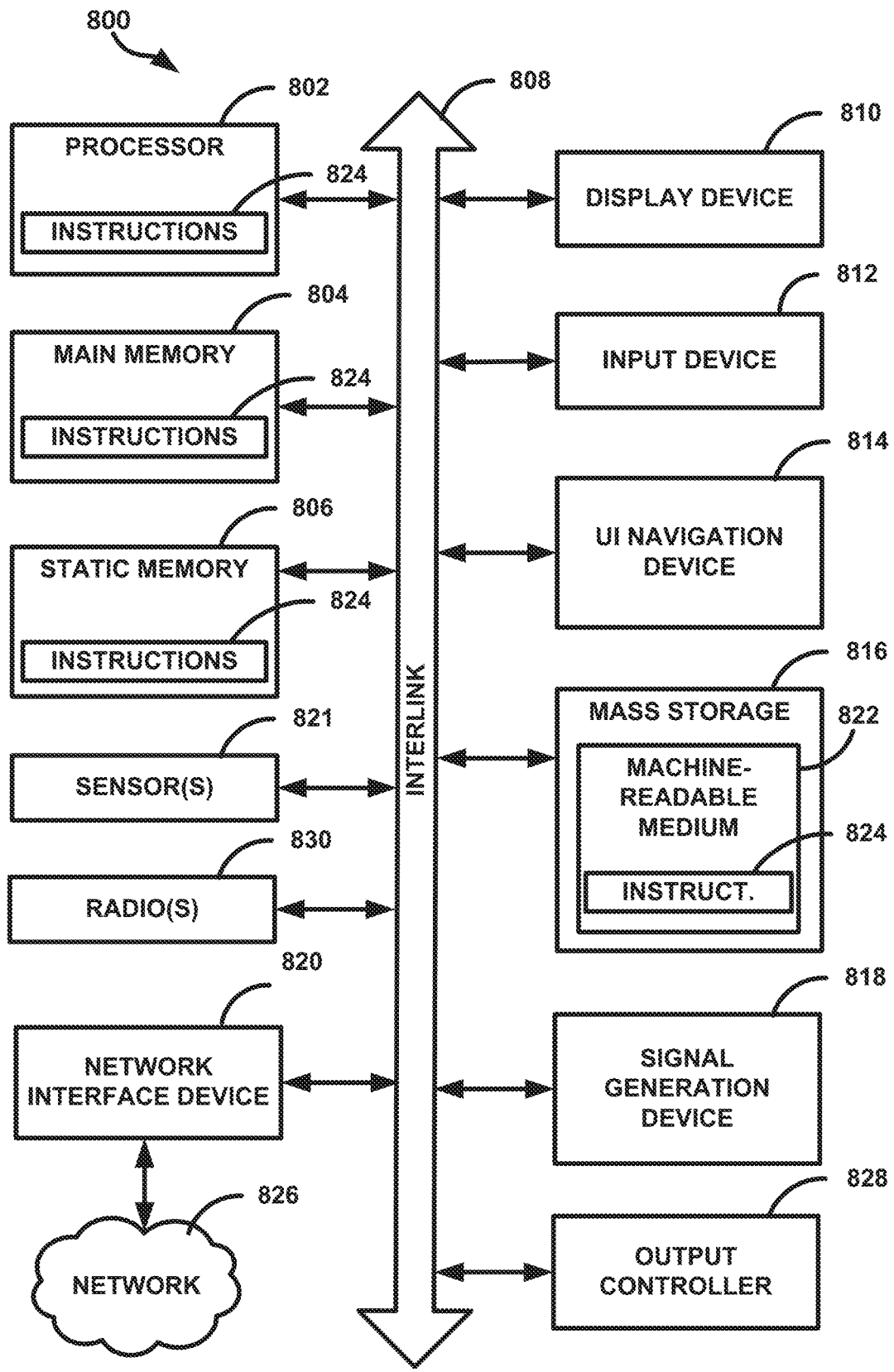
FIG. 8 illustrates, by way of example, a block diagram of an embodiment of a machine in the example form of a computer system within which instructions, for causing the machine to perform any one or more of the methodologies discussed herein, may be executed.

FIG. 8 illustrates, by way of example, a block diagram of an embodiment of a machine in the example form of a computer system 800 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, or the like, or a combination thereof), a main memory 804 and a static memory 806, which communicate with each other via a bus 808. The computer system 800 may further include a display device 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker), a network interface device 820, and radios 830 such as Bluetooth, WWAN, WLAN, and NFC, permitting the application of security controls on such protocols.

The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional Notes and Examples

Example 1 includes a method of colorizing a three-dimensional (3D) point, the method comprising voxelizing 3D points including the 3D point into voxels such that a voxel of the voxels including the 3D point includes a voxel subset of the 3D points, projecting the voxel subset to respective image spaces of first and second images used to generate the 3D points, and associating a color value, determined based on a respective number of pixels of the first and second images to which the voxel subset projects, with the 3D point.

In Example 2, Example 1 further includes identifying a first pixel in the first image to which the 3D point points projects and a second pixel in the second image to which the 3D point projects.

In Example 3, Example 2 further includes, wherein associating the color value with the 3D point further includes determining a first weight for a first color value of the first pixel based on the number of pixels of the first image to which the voxel subset projects and a second weight for a second color value of the second pixel based on the number of pixels of the second image to which the voxel subset projects.

In Example 4, Example 3 further includes, wherein associating the color value with the 3D point further includes determining the color value as a weighted combination of the first and second color values based on the first and second weights.

In Example 5, at least one of Examples 2-4 further includes, wherein associating the color value with the 3D point further includes determining a first brightness value for the first pixel and a second brightness value for the second pixel.

In Example 6, Example 5 further includes, wherein associating the color value with the 3D point further includes determining a third weight for a first color value of the first pixel based on the first brightness value and a fourth weight for a second color value of the second pixel based on the second brightness value.

In Example 7, Example 6 further includes, wherein associating the color value with the 3D point further includes determining the color value as a weighted combination of the first and second color values based on the third and fourth weights.

Example 8 includes a system for colorizing a three-dimensional (3D) point, the system comprising a memory include a 3D point set stored thereon, processing circuitry coupled to the memory, the processing circuitry configured to voxelize 3D points including the 3D point into voxels such that a voxel of the voxels including the 3D point includes a voxel subset of the 3D points, project the voxel subset to respective image spaces of first and second images used to generate the 3D points, and associate a color value, determined based on a respective number of pixels of the first and second images to which the voxel subset projects, with the 3D point.

In Example 9, Example 8 further includes, wherein the processing circuitry is further configured to identify a first pixel in the first image to which the 3D point points projects and a second pixel in the second image to which the 3D point projects.

In Example 10, Example 9 further includes, wherein associating the color value with the 3D point further includes determining a first weight for a first color value of the first pixel based on the number of pixels of the first image to which the voxel subset projects and a second weight for a second color value of the second pixel based on the number of pixels of the second image to which the voxel subset projects.

In Example 11, Example 10 further includes, wherein associating the color value with the 3D point further includes determining the color value as a weighted combination of the first and second color values based on the first and second weights.

In Example 12, at least one of Examples 9-11 further includes, wherein associating the color value with the 3D point further includes determining a first brightness value for the first pixel and a second brightness value for the second pixel.

In Example 13, Example 12 further includes, wherein associating the color value with the 3D point further includes determining a third weight for a first color value of the first pixel based on the first brightness value and a fourth weight for a second color value of the second pixel based on the second brightness value.

In Example 14, Example 13 further includes, wherein associating the color value with the 3D point further includes determining the color value as a weighted combination of the first and second color values based on the third and fourth weights.

Example 15 includes at least one non-transitory machine-readable medium including instructions that, when executed by a machine, cause the machine to perform operations for colorizing a three-dimensional (3D) point, the operations comprising voxelizing 3D points including the 3D point into voxels such that a voxel of the voxels including the 3D point includes a voxel subset of the 3D points, projecting the voxel subset to respective image spaces of first and second images used to generate the 3D points, and associating a color value, determined based on a respective number of pixels of the first and second images to which the voxel subset projects, with the 3D point.

In Example 16, Example 15 further includes, wherein the operations further comprise identifying a first pixel in the first image to which the 3D point points projects and a second pixel in the second image to which the 3D point projects.

In Example 17, Example 16 further includes, wherein associating the color value with the 3D point further includes determining a first weight for a first color value of the first pixel based on the number of pixels of the first image to which the voxel subset projects and a second weight for a second color value of the second pixel based on the number of pixels of the second image to which the voxel subset projects.

In Example 18, Example 17 further includes, wherein associating the color value with the 3D point further includes determining the color value as a weighted combination of the first and second color values based on the first and second weights.

In Example 19, at least one of Examples 16-18 further includes, wherein associating the color value with the 3D point further includes determining a first brightness value for the first pixel and a second brightness value for the second pixel.

In Example 20, Example 19 further includes, wherein associating the color value with the 3D point further includes determining a third weight for a first color value of the first pixel based on the first brightness value and a fourth weight for a second color value of the second pixel based on the second brightness value and determining the color value as a weighted combination of the first and second color values based on the third and fourth weights.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method of colorizing three-dimensional (3D) points in a 3D point set generated based on first and second two-dimensional (2D) images with overlapping field of view using photogrammetry, the method comprising:

voxelizing the 3D points into voxels such that a voxel of the voxels includes a voxel subset of the 3D points;

projecting each 3D point of the voxel subset of the 3D points to respective image spaces of the first and second 2D images;

for each 3D point of the voxel subset, identifying a first color value of a first pixel in the first 2D image to which the 3D point projects and a second color value of a second pixel in the second 2D image to which the 3D point projects; and for each 3D point of the voxel subset, associating a color value with the 3D point, the color value determined based on a weighted combination of the first and second color values, the weights determined based on a respective number of pixels of the first and second 2D images to which the voxel subset projects and a total number of pixels of the first and second 2D images to which the voxel subset projects.

2. The method of claim 1, wherein associating the color value with the 3D point further includes determining a first brightness value for the first pixel and a second brightness value for the second pixel.

3. The method of claim 2, wherein associating the color value with the 3D point further includes determining a third weight for a first color value of the first pixel based on the first brightness value and a fourth weight for a second color value of the second pixel based on the second brightness value.

4. The method of claim 3, wherein associating the color value with the 3D point further includes determining the color value as a weighted combination of the first and second color values based on the third and fourth weights.

5. A system for colorizing a three-dimensional (3D) point, the system comprising:

a memory including a 3D point set stored thereon, the 3D point set generated based on first and second two-dimensional (2D) images with overlapping field of view using photogrammetry;

processing circuitry coupled to the memory, the processing circuitry configured to:

voxelize the 3D points into voxels such that a voxel of the voxels including the 3D point includes a voxel subset of the 3D points;

project each 3D point of the voxel subset to respective image spaces of the first and second 2D images;

for each 3D point of the voxel subset, identify a first color value of a first pixel in the first 2D image to which the 3D point projects and a second color value of a second pixel in the second 2D image to which the 3D point projects; and for each 3D point of the voxel subset, associate a color value with the 3D point, the color value determined based on a weighted combination of the first and second color values and weights determined based on a respective number of pixels of the first and second 2D images to which the voxel subset projects and a total number of pixels of the first and second 2D images to which the voxel subset projects.

6. The system of claim 5, wherein associating the color value with the 3D point further includes determining a first brightness value for the first pixel and a second brightness value for the second pixel.

7. The system of claim 6, wherein associating the color value with the 3D point further includes determining a third weight for a first color value of the first pixel based on the first brightness value and a fourth weight for a second color value of the second pixel based on the second brightness value.

8. The system of claim 7, wherein associating the color value with the 3D point further includes determining the color value as a weighted combination of the first and second color values based on the third and fourth weights.

9. At least one non-transitory machine-readable medium including instructions that, when executed by a machine, cause the machine to perform operations for colorizing a three-dimensional (3D) point of a 3D point set, the 3D point set generated based on first and second two-dimensional (2D) images with overlapping field of view using photogrammetry, the operations comprising:

Voxelizing the 3D points into voxels such that a voxel of the voxels includes a voxel subset of the 3D points;

projecting each 3D point of the voxel subset to respective image spaces of the first and second 2D images;

for each 3D point of the voxel subset, identifying a first color value of a first pixel in the first 2D image to which the 3D point projects and a second color value of a second pixel in the second 2D image to which the 3D point projects; and for each 3D point of the voxel subset, associating a color value with the 3D point, the color value determined based on a weighted combination of the first and second color values and weights determined based on a respective number of pixels of the first and second 2D images to which the voxel subset projects and a total number of pixels of the first and second 2D images to which the voxel subset projects.

10. The at least one non-transitory machine-readable medium of claim 9, wherein associating the color value with the 3D point further includes determining a first brightness value for the first pixel and a second brightness value for the second pixel.

11. The at least one non-transitory machine-readable medium of claim 10, wherein associating the color value with the 3D point further includes determining a third weight for a first color value of the first pixel based on the first brightness value and a fourth weight for a second color value of the second pixel based on the second brightness value and determining the color value as a weighted combination of the first and second color values based on the third and fourth weights.

* * * * *